United States Patent [19]

Clevenger et al.

[11] 4,384,890

[45] May 24, 1983

[54] CUPRIC CHLORIDE LEACHING OF COPPER SULFIDES

[75] Inventors: Galen W. Clevenger, Prescott, Ariz.; George W. Pepple, Ponca City, Okla.

[73] Assignee: Phelps Dodge Corporation, New York, N.Y.

[21] Appl. No.: 347,722

[22] Filed: Feb. 10, 1982

[51] Int. Cl.³ .................... C22B 15/08; C22B 15/12
[52] U.S. Cl. ........................................ 75/109; 75/117; 423/38; 423/140; 423/493; 423/462; 423/632
[58] Field of Search ................... 423/38, 39; 75/109, 75/117; 204/107

[56] References Cited

U.S. PATENT DOCUMENTS

| | | | |
|---|---|---|---|
| 86,754 | 2/1869 | Hunt et al. | 423/38 |
| 290,548 | 12/1885 | Drouin | 75/114 |
| 364,174 | 5/1887 | Hunt et al. | 75/117 |
| 415,576 | 11/1889 | Siemens | 204/108 |
| 415,738 | 11/1889 | Seegall | 204/107 |
| 507,130 | 10/1893 | Hoepfner | 204/107 |
| 552,960 | 1/1896 | Hoepfner | 423/35 |
| 704,639 | 7/1902 | Hoepfner | 204/107 |
| 740,014 | 9/1903 | Herman | 75/117 |
| 1,148,798 | 8/1915 | Pyne et al. | 204/106 |
| 1,195,616 | 8/1916 | Slater | 75/117 |
| 1,251,485 | 1/1918 | DeLuce | 204/107 |
| 1,263,727 | 4/1918 | Anderson | 75/117 |
| 1,528,207 | 3/1925 | Greenawalt | 204/107 |
| 1,539,712 | 5/1925 | Christensen | 75/114 |
| 1,539,714 | 5/1925 | Christensen | 75/114 |
| 1,570,777 | 1/1926 | Pike | 75/104 |
| 1,588,806 | 6/1926 | Pike et al. | 75/104 |
| 1,757,047 | 5/1930 | Hosenfeld et al. | 204/107 |
| 2,008,373 | 7/1935 | Tobelmann | 75/18 |
| 2,046,937 | 7/1936 | Curtin | 23/55 |
| 2,586,579 | 2/1952 | Supiro | 23/97 |
| 2,647,830 | 8/1953 | Allen et al. | 75/103 |
| 2,647,831 | 8/1953 | Allen et al. | 75/103 |
| 2,647,832 | 8/1953 | Allen et al. | 75/108 |
| 3,194,653 | 7/1965 | Keyes | 75/109 |
| 3,260,593 | 7/1966 | Zimmerley et al. | 75/117 |
| 3,288,599 | 11/1966 | Keyes | 75/109 |
| 3,436,177 | 4/1969 | Spedden et al. | 23/172 |
| 3,476,554 | 11/1969 | Spedden et al. | 75/109 |
| 3,490,899 | 1/1970 | Krivsky et al. | 75/109 |
| 3,630,722 | 12/1971 | Chew | 75/76 |
| 3,637,372 | 1/1972 | Mayor et al. | 75/101 |
| 3,642,435 | 2/1972 | Allen et al. | 23/117 |
| 3,669,650 | 6/1972 | Elstein et al. | 75/101 |
| 3,673,061 | 6/1972 | Kruesi | 204/105 R |
| 3,674,424 | 7/1972 | Stanley et al. | 23/15 W |
| 3,692,647 | 9/1972 | Chambers | 204/107 |
| 3,764,490 | 10/1973 | Chambers | 204/52 R |
| 3,767,543 | 10/1973 | Hazen | 204/107 |
| 3,776,826 | 12/1973 | Atadan | 204/107 |
| 3,785,944 | 1/1974 | Atwood | 75/117 |
| 3,798,026 | 3/1974 | Milner et al. | 75/104 |
| 3,879,272 | 4/1975 | Atwood et al. | 204/107 |
| 3,880,732 | 4/1975 | Sardisco | 204/107 |
| 3,880,748 | 6/1975 | Brennecke | 204/108 |
| 3,901,776 | 8/1975 | Kruesi et al. | 204/107 |
| 3,922,167 | 11/1975 | Pernichele et al. | 75/109 |
| 3,923,616 | 12/1975 | Atadan et al. | 204/107 |
| 3,957,602 | 5/1976 | Johnson et al. | 204/106 |
| 3,972,711 | 8/1976 | Goens et al. | 75/117 |
| 4,011,146 | 3/1977 | Coltrinari et al. | 204/66 |
| 4,013,457 | 3/1977 | Goens et al. | 75/104 |
| 4,023,964 | 3/1977 | Demarthe | 75/117 |
| 4,026,772 | 5/1977 | Ammann et al. | 204/106 |
| 4,039,324 | 8/1977 | Stephens, Jr. et al. | 75/72 |
| 4,053,305 | 10/1977 | Smyres et al. | 75/104 |
| 4,070,182 | 1/1978 | Genik-Sas-Berezowsky et al. | 75/103 |
| 4,101,315 | 7/1978 | Peters et al. | 75/104 |
| 4,107,009 | 8/1978 | Everett | 204/129 |
| 4,115,221 | 9/1978 | Wadsworth et al. | 204/108 |
| 4,124,379 | 11/1978 | Peters et al. | 75/118 R |
| 4,230,487 | 10/1980 | Demarthe | 75/117 |
| 4,337,128 | 6/1982 | Haakonsen | 423/38 |
| 4,341,742 | 7/1982 | Clark | 423/39 |

FOREIGN PATENT DOCUMENTS

| | | |
|---|---|---|
| 2715 | of 1882 | United Kingdom . |
| 4626 | of 1888 | United Kingdom . |
| 22030 | of 1891 | United Kingdom . |
| 9052 | of 1895 | United Kingdom . |
| 13499 | of 1911 | United Kingdom . |
| 276008 | 8/1927 | United Kingdom . |

OTHER PUBLICATIONS

Canada Department of Mines Report, No. 643 (1924), No. 688 (1926).

U.S. Bureau of Mines Report of Investigations 7182 (9/68).

McLean, Daniel C., "Chloride Leaching of Copper Concentrates Practical Operational Aspects", paper presented at the Feb. 1982 Dallas AIME Meeting.

*Primary Examiner*—Brian E. Hearn
*Attorney, Agent, or Firm*—Donald E. Degling

[57] ABSTRACT

A continuous process for obtaining copper from a copper sulfide by:
- (a) contacting a first batch of the copper sulfide with a first lixiviant containing cupric chloride, and a minimum amount of ferrous chloride to leach copper;
- (b) separating the leach liquor from (a) from the undissolved solids and dividing the liquor into two portions; one portion of the liquor containing about the same amount of copper as is leached from the copper sulfide in (a) and (f);
- (c) cementing with iron the copper from the one portion of the liquor from (b);
- (d) recombining the portions of the liquor from (b);
- (e) oxidizing with oxygen the recombined portions from (d) to form a second lixiviant; the cuprous chloride therein being oxidized to cupric chloride and the iron therein, from cementing copper, being oxidized and precipitated;
- (f) contacting the copper sulfide solids from (b) with the second lixiviant from (e) to additionally leach the first batch of the copper sulfide;
- (g) recycling the leach liquor from (f) to (a) and using it as the first lixiviant in (a) for leaching copper from a second batch of the copper sulfide, whereby substantially all the cupric chloride in the first lixiviant is reduced to cuprous chloride in (a).

13 Claims, 1 Drawing Figure

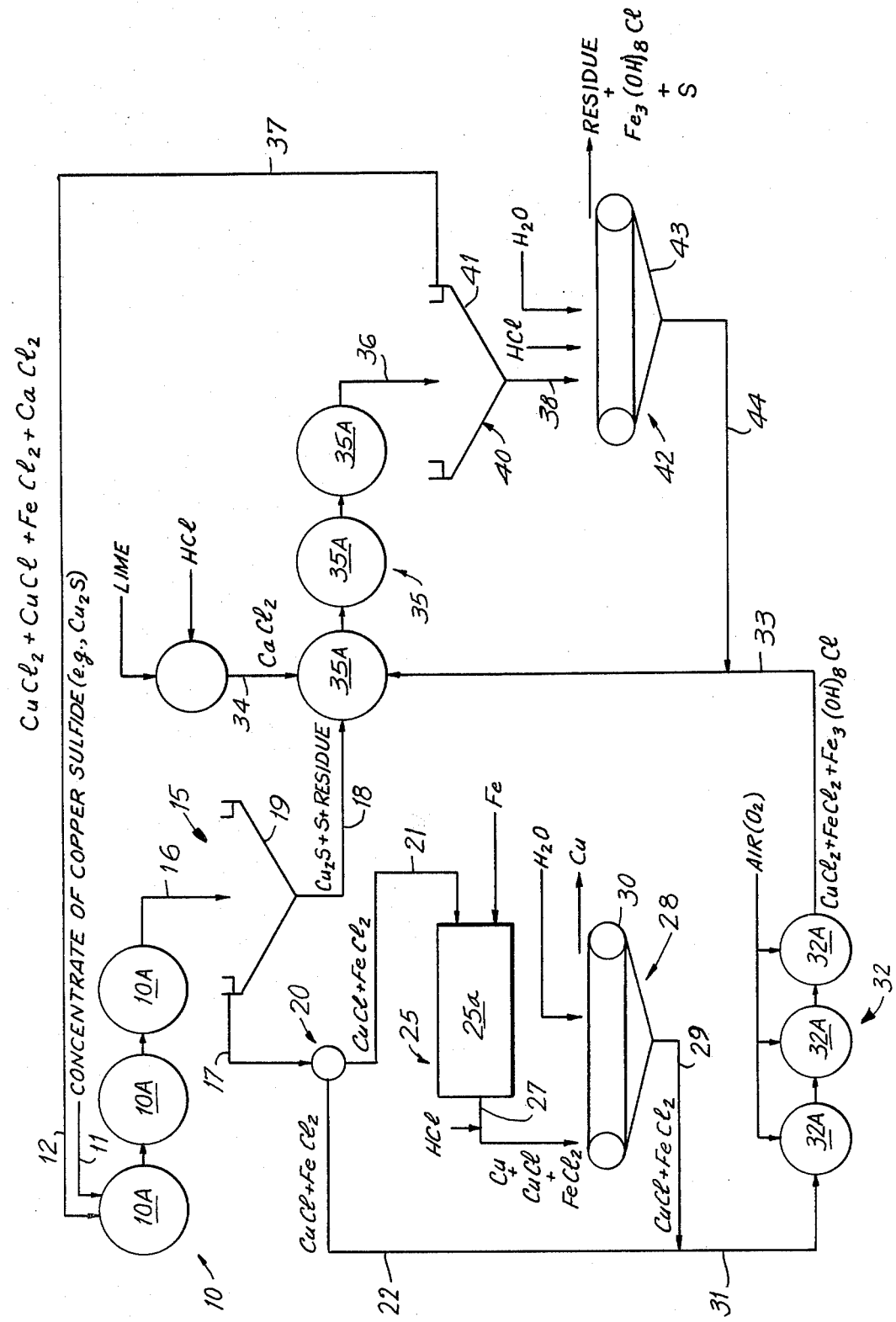

CUPRIC CHLORIDE LEACHING OF COPPER SULFIDES

BACKGROUND OF THE INVENTION

This invention relates to an improved hydrometallurgical process for obtaining copper from a copper sulfide ore. This invention particularly relates to a simple continuous process of leaching copper from a copper sulfide with a cupric chloride lixiviant.

Processes in which copper is leached from a copper sulfide with a cupric chloride lixiviant have been known for a long time. See, for example, U.S. Pat. Nos. 507,130, 552,960, 1,263,727, 3,692,647, 3,776,826, 3,785,944, and 4,013,457.

However, such hydrometallurgical processes have tended to be significantly more expensive than conventional pyrometallurgical processes for making copper. As a result, it has only been since the advent of increasingly stringent air pollution control regulations and standards, promulgated by Federal and State agencies within the last few years, that such hydrometallurgical processes have appeared attractive. Such hydrometallurgical processes do not produce the toxic and noxious emissions of suspended particulate materials and sulfur oxides which can be a problem with conventional pyrometallurgical processes. In this regard, the particularly troublesome sulfur oxides, produced by conventional pyrometallurgical processes, are not produced by such hydrometallurgical processes which convert any sulfur compounds into solid elemental sulfur.

However, to be practical, a hydrometallurgical process for obtaining copper has had to provide for essentially complete recovery of all the copper in the copper sulfide. In addition, the use of moderate process temperatures and pressures has been preferred to avoid high capital and operating costs. Furthermore, the copper produced has had to be of a high grade, so that further expensive processing of the copper to obtain commercially acceptable anode copper can be minimized. In addition, regeneration of the reagents, used in the process, has been important to keep costs low. Finally, it has been important that little or no toxic wastes be produced by the process.

SUMMARY OF THE INVENTION

In accordance with this invention, a continuous process is provided for obtaining copper from a copper sulfide by:
(a) contacting a first batch of the copper sulfide with a first lixiviant containing cupric chloride, a source of chloride ions, and only a minimum amount of ferrous chloride to leach copper from the first batch of the copper sulfide;
(b) separating the leach liquor from step (a) from the undissolved copper sulfide solids from step (a) and dividing the leach liquor into two portions; one portion of the leach liquor from step (a) containing about the same amount of copper as is leached from the first batch of the copper sulfide in steps (a) and (f);
(c) cementing with iron the copper from the one portion of the leach liquor from step (b);
(d) recombining the portions of the leach liquor from step (b);
(e) oxidizing with oxygen the recombined portions of the leach liquor from step (d) to form a second lixiviant containing cupric chloride and a source of chloride ions; the cuprous chloride in the recombined leach liquor portions from step (d) being oxidized to cupric chloride and the iron therein, from cementing copper, being oxidized to a ferric hydroxide precipitate so that there is only a minimum amount of ferrous chloride in the second lixiviant;
(f) contacting the undissolved copper sulfide solids from step (b) with the second lixiviant from step (e) to leach additional copper from the first batch of the copper sulfide; and then
(g) recycling the leach liquor from step (f) to step (a) and using the leach liquor from step (f) as the first lixiviant in step (a) for leaching copper from a second batch of the copper sulfide, whereby substantially all the cupric chloride in the first lixiviant is reduced to cuprous chloride in step (a).

By this hydrometallurgical process, high grade cement copper can be obtained from a copper sulfide ore at low cost and in high yields. In the process, only moderate temperatures and pressures are needed, and all the reagents, except for the iron, can be regenerated. Most significantly, substantial amounts of toxic or noxious waste materials are not produced by the process.

BRIEF DESCRIPTION OF THE DRAWING

Shown in the Drawing is a schematic flow chart of the process of this invention.

DETAILED DESCRIPTION OF THE INVENTION

As used throughout this description, the term "copper" preferably means the element copper (Cu).

In the process of this invention, any copper sulfide, from which copper values can be leached utilizing a heated aqueous solution containing cupric chloride, can be used as the starting material. Among the copper sulfides which can be used are covellite (CuS) and chalcocite ($Cu_2S$). Preferably, the copper sulfide is a copper sulfide concentrate (a) which contains at least about 15 to 20% (by weight), preferably about 26 to 28%, of copper and sulfur values and (b) in which the molar ratio of copper to sulfur is about 1.5 or more. Particularly preferred is a concentrate of chalcocite.

With reference to the Drawing, the first step of the process of this invention is a primary leaching step, generally 10. In the primary leaching step 10, a first batch 11 of copper sulfide is contacted with a first aqueous lixiviant 12. The first lixiviant 12 contains cupric chloride ($CuCl_2$), cuprous chloride (CuCl), a source of chloride ions and a minimum amount of ferrous chloride ($FeCl_2$).

In the primary leaching step 10, chalcocite in the first batch 11 of copper sulfide is preferably converted by the cupric chloride in the first lixiviant 12 to cuprous chloride and elemental sulfur according to the following reaction:

Also in the primary leaching step 10, chalcocite in the first batch 11 of copper sulfide may be converted to covellite by the following reaction:

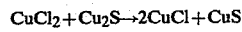

The primary leaching step 10 can be suitably carried out with conventional equipment and materials. Preferably, the primary leaching step is carried out in two or more, mechanically agitated tanks 10A, through which the first batch 11 of copper sulfide and the first lixiviant 12 travel in cocurrent fashion. The use of at least two tanks 10A provides sufficient reaction time so that one-third to two-thirds, preferably one-half to two-thirds, of the copper in the first batch 11 of copper sulfide is leached in the primary leaching step 10 and the remainder of the copper in the first batch 11 of copper sulfide is leached in a later, secondary leaching step. Preferably the tanks 10A, as well as the other process equipment utilized in the process of this invention, are lined, e.g., butyl rubber lined, to prevent their corrosion.

In the primary leaching step 10, particular reaction conditions are not critical. However, it is preferred that the primary leaching step 10 be carried out at elevated temperatures of 70° C. or higher, up to the boiling point of the first lixiviant 12, to increase the rate of reaction. The preferred leaching temperature is about 70° to 90° C., especially about 80° C. It is also preferred that the primary leaching step 10 be carried out at atmospheric pressure.

The source of chloride ions, use in the first lixiviant 12, also is not critical. In this regard, any chloride compound, which will complex or otherwise solubilize cuprous ions in the first lixiviant, can be used. Among the sources of chloride ions which can be suitably utilized are hydrogen chloride, the alkali metal chlorides and the alkaline earth metal chlorides, such as sodium chloride, potassium chloride and calcium chloride, preferably calcium chloride ($CaCl_2$).

The amount of ferrous chloride in the first lixiviant 12 also is not critical. The ferrous chloride comes from any iron salts that are mixed with the copper sulfide and from the cementation of copper with iron which follows the primary leaching step 10. Preferably, the concentration of ferrous chloride in the first lixiviant 12 is a minimum (ideally, 0 g/l), and it is particularly preferred that the ferrous chloride concentration be less than approximately 23 g/l (i.e., the iron concentration is less than approximately 10 g/l).

The amount of cupric chloride in the first lixiviant 12 also is not critical. Preferably, the amount of cupric chloride in the first lixiviant 12 is less than the stoichiometric amount of cupric chloride, required to react with all the copper sulfide in the first batch 11 of copper sulfide, used in the primary leaching step 10. In this regard, it is particularly preferred that the amount of cupric chloride in the first lixiviant be sufficient to leach one-half to two-thirds of the copper in the first batch 11 of copper sulfide. Thereby, nearly all the cupric chloride in the first lixiviant 12 will be converted to cuprous chloride during the primary leaching step 10.

In the next step, generally 15, of the process of this invention, the aqueous slurry 16, produced in the primary leaching step 10, is treated to separate the primary leach liquor 17 from the solids, generally 18, from the first batch 11 of copper sulfide, which solids are left undissolved by the first lixiviant 12. The undissolved copper sulfide solids 18 comprise copper sulfides, such as chalcocite and covellite, elemental sulfur and residue from the first batch 11 of copper sulfide. This separation step 15 can be carried out in a conventional manner, e.g., in a thickener 19. One example of a suitable butyl rubber lined thickener 19 is made by Envirotech Process Equipment of Denver, Colo. under its Eimco trademark.

Following the separation 15 of the primary leach liquor 17 from the undissolved copper sulfide solids 18, the primary leach liquor 17 is divided in the next step, generally 20, into two portions 21 and 22. In carrying out the division 20 of the primary leach liquor 17, one portion 21 of the primary leach liquor 17 is made sufficiently large so that it contains about the same amount of copper, as cuprous chloride, as is leached from each batch 11 of copper sulfide by the process of this invention in the primary leaching step 10 and in the later, secondary leaching step.

The one portion 21 of the primary leach liquor 17 is then treated with iron metal (Fe) to precipitate its copper content as copper metal (Cu) or cement copper. In this cementation step, generally 25, cement copper precipitates from, and ferrous chloride dissolves in, the one portion 21 of the primary leach liquor 17 according to the following reaction:

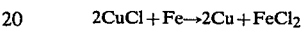

$$2CuCl + Fe \rightarrow 2Cu + FeCl_2$$

In accordance with this invention, the separation step 15 and the cementation step 25 are controlled so that: (a) the copper removed from the one portion 21 of the primary leach liquor 17 in the cementation step 25 equals the copper leached from each batch 11 of copper sulfide by the process of this invention; and (b) sufficient copper values remain in the other portion 22 of the primary leach liquor 17 for regenerating the cupric chloride lixiviant used to leach copper from each subsequent batch 11 of copper sulfide.

The cementation step 25 can be carried out in a conventional manner. In this regard, scrap iron or any other inexpensive source of iron metal can be used. In carrying out the cementation 25, any conventional cementation apparatus 25A also can be used. Preferably, a rotating drum is used, having a hopper at one end, into which scrap iron and the one portion 21 of the primary leach liquor 17 are fed continuously, as disclosed in United States Bureau of Mines Report of Investigations 7182 (September 1968).

In the cementation step 25, particular temperatures and pressures also are not critical, but elevated temperatures and atmospheric pressures are preferred. In this regard, temperatures are usually about 90° to 100° C. in this step due to the heat of reaction.

Preferably, only the minimum amount of iron metal, needed to cement substantially all the copper values from the one portion 21 of the primary leach liquor 17, is used in the cementation step 25. In this regard, the amount of iron needed to cement all the copper in the one portion 21 of the primary leach liquor 17 is generally very small because nearly all the copper in the primary leach liquor is cuprous chloride and there is little or no cupric chloride in the primary leach liquor.

Following the cementation step 25, the aqueous slurry 27 produced in the cementation step is preferably treated with a dilute aqueous hydrochloric acid (HCl) solution. The hydrochloric acid converts any iron oxide ($Fe_2O_3$), which may be mixed with the cement copper in the slurry 27, to a soluble iron chloride. Thereby, a higher grade cement copper can be obtained when the cement copper is subsequently filtered and washed.

The cement copper can then be separated in a conventional filtration step, generally 28, from the liquid portion 29 of the aqueous slurry 27 from the cementation step 25. Preferably, such filtration 28 is carried out continuously with a conventional horizontal belt filter 30 having (a) an endless moving filter belt, upon which the slurry 27 is deposited, and (b) suction apparatus beneath the belt, which removes the liquid portion 29 of the slurry 27 but leaves the cement copper filtrate on the filter belt. An example of a suitable horizontal belt filter 30 is made by Envirotech Process Equipment under the trade name Eimco Horizontal Belt Extractor. The belt filter 30 preferably includes a perforated, butyl rubber, filter belt which is covered with an acid-resistant fabric, such as an acrylic fabric, e.g., Orlon. Preferably, the cement copper filtrate on the horizontal belt filter 30 is also continuously washed with water in a conventional counter-current manner to remove any soluble contaminents, such as chlorides, from the surface of the cement copper.

The cement copper can be removed from the horizontal belt filter 30 in a conventional manner, e.g., by scraping it from the discharge end of the filter belt. The cement copper can then be suitably formed into a dense metal briquette in a conventional briquetting press. Such briquettes can be pressed so that they are strong enough for further handling or shipment. Briquetting also inhibits oxidation of the copper.

The liquid portion 29 of the aqueous slurry 27 from the cementation step 25, which portion 29 is derived from the one portion 21 of the leach liquor 17 from the primary leaching step 10, is then recombined with the other portion 22 of the primary leach liquor 17. In the resulting recombined primary leach liquor portions 31, the one portion 21 of the primary leach liquor 17 contains a significant amount of ferrous chloride from the cementation step 25 but little or no cuprous chloride, and the other portion 22 of the primary leach liquor 17 contains a significant amount of cuprous chloride but little ferrous chloride. In this regard, the other portion 22 of the primary leach liquor 17 preferably contains an amount of cuprous chloride which, when oxidized with oxygen, will provide the stoichiometric amount of cupric chloride, required to leach all of the copper from a batch 11 of copper sulfide.

Then, the recombined primary leach liquor portions 31 are oxidized with oxygen. This oxidation step, generally 32, forms a second or regenerated lixiviant 33 containing cupric chloride and a minimum amount of ferrous chloride. In the oxidation step 32, cuprous chloride in the recombined primary leach liquor portions 31 is oxidized to cupric chloride, and iron, which is present as ferrous chloride in the recombined primary leach liquor portions 31, is oxidized to form a ferric hydroxide precipitate ($Fe_3(OH)_8Cl$) by the following reaction:

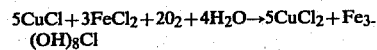

$$5CuCl + 3FeCl_2 + 2O_2 + 4H_2O \rightarrow 5CuCl_2 + Fe_3(OH)_8Cl$$

Most of the iron in the recombined primary leach liquor portions 31 comes from the cementation step 25, and almost all of the iron is oxidized and precipitated from the recombined primary leach liquor portions 31 during the oxidiation step 32. In this regard, only the minimum amount of iron, needed to prevent significant amounts of copper from being oxidized and precipitated from the recombined primary leach liquor portions 31 as a copper hydroxide ($Cu(OH)_2$), is left unoxidized in the recombined primary leach liquor portions 31 by the oxidiation step 32. In this regard, no more than about 25 g/l, preferably only about 5 to 10 g/l, of iron are left unoxidized in the recombined primary leach liquor portions 31.

The oxidation 32 of the recombined primary leach liquor portions 31 can be carried out in a conventional manner and in conventional apparatus. For example, the oxidation step 32 can be suitably carried out by blowing an oxygen containing gas, preferably compressed air, into mechanically agitated tanks 32A containing the recombined primary leach liquor portions 31. During the oxidation step 32, it is preferred that the recombined primary leach liquor portions 31 be gently agitated in the tanks 32A, so that the ferric hydroxide precipitate, which is formed, is of relatively large, and hence easily filtrable, particle size.

In the oxidation step 32, particular temperatures and pressures are not critical. However, the oxidation step 32 is preferably carried out at elevated temperatures of about 50° to 60° C. and at atmospheric pressure.

The oxidation step 32, when carried out using air, requires very intimate contact of fine air bubbles with the recombined primary leach liquor portions 31. Such fine air bubbles can be provided by, inter alia, introducing air through small, e.g., ¼ inch, holes at the bottom of the tanks 32A containing the recombined primary leach liquor portions 31. Alternatively, a circulating jet aerator can be provided in each tank 32A to provide intimate contact between air and the recombined primary leach liquor portions 31.

In accordance with this invention, the second lixiviant 33, produced by the oxidation step 32, should contain at least about 2.3 pounds, preferably about 2.5 pounds, of copper as cupric chloride per pound of copper in each batch 11 of copper sulfide, fed to the primary leaching step 10.

Preferably, additional amounts 34 of the source of chloride ions are added to the second lixiviant 33 produced by the oxidation step 32. This is done to make up for chloride ions which are lost with the ferric hydroxide precipitate formed in the oxidation step 32. The additional amounts 34 of the source of chloride ions can be added to the second lixiviant 33 as such. However, if calcium chloride is used as the source of chloride ions, the calcium chloride is preferably added to the second lixiviant 33 as lime (CaO) and hydrogen chloride (HCl). In this regard, it is preferred that enough calcium chloride be added to the second lixiviant 33 to give a concentration of calcium of about 80 to 120 g/l, preferably about 100 g/l.

The second lixiviant 33 is then used in a secondary leaching step, generally 35, to leach the remaining copper values from the undissolved copper sulfide solids 18 from the primary leaching step 10. The secondary leaching step 35 is preferably carried out in the same manner as the primary leaching step 10 in two or more, agitated tanks 35A.

Following the secondary leaching step 35, the resulting aqueous slurry 36 is treated to separate the secondary leach liquor 37 from any remaining solids 38. The remaining solids 38, separated in this step, generally 40, principally comprise elemental sulfur, residue from the copper sulfide, and ferric hydroxide precipitate from the oxidation step 32. This separation step 40 can be carried out in the same manner as the separation step 15, used to separate the primary leach liquor 17 from the undissolved copper sulfide solids 18. In this regard, the use of a conventional thickener 41 is preferred.

The remaining solids 38 are then washed free of any remaining secondary leach liquor 37 on the surface of such solids. This washing step, generally 42, is preferably carried-out with a conventional horizontal belt filter 43 like the horizontal belt filter 30 used to filter the cement copper in step 28. In carrying-out washing step 42, it is preferred that the remaining solids 38 be deposited on the filter belt of the horizontal belt filter 43 and then be washed with water in a counter-current fashion. The wash water 44, containing secondary leach liquor 37, can then be recovered and mixed with the second lixiviant 33 used in the secondary leaching step 35. It is also preferred that the remaining solids 38 on the horizontal belt filter 43 be treated with dilute aqueous hydrochloric acid to solubilize any residual cuprous chloride on the surface of the remaining solids 38.

It has been discovered that, in the process of this invention, gypsum ($CaSO_4$) is formed in the recombined primary leach liquor portions 31 during the oxidation step 32 when the source of chloride ions is calcium chloride. The gypsum, formed, simplifies the filtration and washing of the remaining solids 38, particularly the ferric hydroxide precipitate, on the horizontal belt filter 43. In this regard, the gypsum appears to act as a filter aid.

Preferably, the secondary leach liquor 37, which contains cupric chloride, as well as cuprous chloride and the source of chloride ions, is then recycled from the secondary leaching step 35 to the primary leaching step 10. In the primary leaching step 10, the secondary leach liquor 37 is used as the first lixiviant 12 for leaching copper from another batch 11 of copper sulfide. In the primary leaching step 10, the cupric chloride in the first lixiviant 12 is preferably reduced to cuprous chloride.

By the process of this invention, about 91 to 97% of the copper in a copper sulfide can be suitably obtained as cement copper. The cement copper, produced by this process, can contain in excess of 90% copper, along with small amounts of iron and silver, as well as some gold. Preferably, the cement copper from the process is purified further in a conventional manner by smelting or electrorefining. For example, the cement copper can be suitably purified further by: oxidizing it at low temperatures, such as 100° to 300° C.; then dissolving it in a strong mineral acid, such as sulfuric acid; and then recovering it in a conventional multistage electrowinning circuit.

Substantial amounts of sulfur oxides are not produced as by-products of the process of this invention. Rather, almost all the sulfur values, introduced into the process, are converted to elemental sulfur. Furthermore, the process steps of this invention are all carried out in aqueous solutions. This minimizes environmental and health problems from dust and fumes produced in the course of the process.

The invention and many of its attendant advantages will be understood from the foregoing description, and it will be apparent that various changes may be made in the steps of the process of this invention without departing from the spirit and scope of the invention or sacrificing all of its material advantages, the form hereinbefore described being merely a preferred embodiment thereof.

We claim:

1. A continuous process for obtaining copper from a copper sulfide, comprising the steps of:
   (a) contacting a first batch of the copper sulfide with a first lixiviant containing cupric chloride, a source of chloride ions, and only a minimum amount of ferrous chloride to leach copper from the first batch of the copper sulfide;
   (b) separating the leach liquor from step (a) from the undissolved copper sulfide solids from step (a) and dividing the leach liquor into two portions; one portion of the leach liquor from step (a) containing about the same amount of copper as is leached from the first batch of the copper sulfide in steps (a) and (f);
   (c) cementing with iron the copper from the one portion of the leach liquor from step (b);
   (d) recombining the portions of the leach liquor from step (b);
   (e) oxidizing with oxygen the recombined portions of the leach liquor from step (d) to form a second lixiviant containing cupric chloride and a source of chloride ions; the cuprous chloride in the recombined leach liquor portions from step (d) being oxidized to cupric chloride and the iron therein, from cementing copper, being oxidized to a ferric hydroxide precipitate so that there is only a minimum amount of ferrous chloride in the second lixiviant;
   (f) contacting the undissolved copper sulfide solids from step (b) with the second lixiviant from step (e) to leach additional copper from the first batch of the copper sulfide; and then
   (g) recycling the leach liquor from step (f) to step (a) and using the leach liquor from step (f) as the first lixiviant in step (a) for leaching copper from a second batch of the copper sulfide, whereby substantially all the cupric chloride in the first lixiviant is reduced to cuprous chloride in step (a).

2. The process of claim 1 wherein the recombined portions of the leach liquor from step (d) are oxidized by very intimate contact with fine bubbles of air.

3. The process of claim 1 or claim 2 wherein the recombined leach liquor portions from step (d) are gently agitated during the oxidation step (e).

4. The process of claim 1 wherein the source of chloride ions is calcium chloride.

5. The process of claim 4 wherein the ferric hydroxide precipitate produced in step (e) and any other remaining solids, mixed with the leach liquor from step (f), are separated from the leach liquor from step (f) with a filter belt.

6. The process of claim 1 wherein the copper sulfide comprises chalcocite.

7. The process of claim 1 wherein the first lixiviant comprises less than approximately 23 g/l of ferrous chloride.

8. The process of claim 1 or claim 7 wherein the first lixiviant comprises about one-third to two-thirds of the stoichiometric amount of cupric chloride, required to leach all of the copper in the first batch of the copper sulfide.

9. The process of claim 8 wherein the first lixiviant comprises about one-half to two-thirds of the stoichiometric amount of cupric chloride.

10. The process of claim 1 wherein no more than about 25 g/l of iron are left unoxidized in step (e) in the recombined leach liquor portions from step (d).

11. The process of claim 10 wherein only about 5 to 10 g/l of iron are left unoxidized in step (e) in the recombined leach liquor portions from step (d).

12. The process of claim 1, claim 10 or claim 11 wherein the second lixiviant, produced in step (e), contains at least about 2.3 pounds of copper as cupric chloride per pound of copper in the second batch of copper sulfide.

13. The process of claim 12 wherein the second lixiviant, produced in step (e), contains about 2.5 pounds of copper as cupric chloride per pound of copper in the second batch of copper sulfide.

* * * * *